(12) United States Patent
Dube

(10) Patent No.: US 9,573,816 B2
(45) Date of Patent: Feb. 21, 2017

(54) SYSTEM FOR LOW PRESSURE CARBON DIOXIDE REGENERATION IN A CHILLED AMMONIA PROCESS

(71) Applicant: ALSTOM Technology Ltd, Baden (CH)

(72) Inventor: Sanjay Kumar Dube, Knoxville, TN (US)

(73) Assignee: General Electric Technology GmbH, Baden (CH)

( * ) Notice: Subject to any disclaimer, the term of this patent is extended or adjusted under 35 U.S.C. 154(b) by 49 days.

(21) Appl. No.: 14/677,238

(22) Filed: Apr. 2, 2015

(65) Prior Publication Data

US 2016/0289080 A1  Oct. 6, 2016

(51) Int. Cl.
| | |
|---|---|
| *B01J 47/06* | (2006.01) |
| *C01B 31/20* | (2006.01) |
| *B01D 53/78* | (2006.01) |
| *B01D 53/62* | (2006.01) |
| *B01D 53/14* | (2006.01) |

(52) U.S. Cl.
CPC ........... *C01B 31/20* (2013.01); *B01D 53/1425* (2013.01); *B01D 53/1493* (2013.01); *B01D 53/62* (2013.01); *B01D 53/78* (2013.01); *B01D 2252/102* (2013.01); *B01D 2258/0283* (2013.01)

(58) Field of Classification Search
CPC ............. B01J 38/66; B01J 29/90; B01J 23/96; B01J 23/94; B01J 23/92; B01J 47/06; C01B 31/088

USPC ...................................................... 502/26, 56
See application file for complete search history.

(56) References Cited

U.S. PATENT DOCUMENTS

| | | | |
|---|---|---|---|
| 7,846,240 B2 | 12/2010 | Gal et al. | |
| 8,308,849 B2 | 11/2012 | Gal et al. | |
| 8,758,493 B2 | 6/2014 | Gal et al. | |
| 2003/0045756 A1 | 3/2003 | Mimura et al. | |
| 2008/0128291 A1 | 6/2008 | Meessen et al. | |
| 2008/0307968 A1 | 12/2008 | Kang et al. | |
| 2009/0101012 A1 | 4/2009 | Gal et al. | |
| 2010/0083831 A1 | 4/2010 | Gal et al. | |
| 2010/0089110 A1 | 4/2010 | Duncan et al. | |
| 2011/0100218 A1 | 5/2011 | Wolfe | |
| 2011/0311429 A1 | 12/2011 | Liu et al. | |
| 2012/0258031 A1 | 10/2012 | Guidolin et al. | |

FOREIGN PATENT DOCUMENTS

| | | |
|---|---|---|
| DE | 19808433 | 9/1999 |
| EP | 2 229 996 A1 | 9/2010 |
| WO | 2009/000025 A1 | 12/2008 |
| WO | 2009/091437 A1 | 7/2009 |

*Primary Examiner* — Edward Johnson
(74) *Attorney, Agent, or Firm* — GE Global Patent Operation; Cynthia W. Flanigan

(57) ABSTRACT

Disclosed herein is a system for generating a carbon dioxide gas stream that includes an absorber, a regenerator that lies downstream of the absorber, a carbon dioxide wash station that lies downstream of the regenerator and a reverse osmosis system for receiving a wash solution from the carbon dioxide wash station.

10 Claims, 3 Drawing Sheets

SYSTEM FOR LOW PRESSURE CARBON DIOXIDE REGENERATION IN A CHILLED AMMONIA PROCESS

BACKGROUND

This disclosure relates to low pressure carbon dioxide regeneration in a chilled ammonia process.

In currently existing chilled ammonia processes, carbon dioxide is extracted from flue gas and generally leaves the regenerator at pressures typically around 25 bar. Regenerating carbon dioxide at these pressures not only reduces the ammonia content of the carbon dioxide but also reduces the amount of work that is performed by compressors located downstream of the regenerator. However, the operation of the regenerator at higher pressure requires relatively high pressure (approximately 8 bar) steam, which increases the overall electrical demand on the chilled ammonia process.

Carbon dioxide is often desired by customers at pressures lower than 25 bar. At lower pressures the amount of ammonia emissions from the regenerator increases substantially and consequently this increases the stripper load with the result that the regenerator pressure is not reduced. It should be noted that for low pressure carbon dioxide regeneration, low pressure steam can be used which will save significant amounts of steam to electrical duty demand from the power plant. However, at lower pressure, the overall chilled ammonia process energy consumption increases to a point that the feasibility of operating the regenerator at lower pressure becomes un-economical (largely due to increase in stripper energy).

SUMMARY

Disclosed herein is a system for generating lower pressure carbon dioxide comprising an absorber that is operative to use an ammoniated solution to extract carbon dioxide from a flue gas stream to produce a carbon dioxide rich solution; a regenerator that lies downstream of the absorber; where the regenerator operates at a pressure of 3 to 25 bar and is operative to extract carbon dioxide from the carbon dioxide rich solution; a carbon dioxide wash station that lies downstream of the regenerator; where the carbon dioxide wash station is operative to receive a carbon dioxide gas stream and to reduce an ammonia concentration contained therein; and a reverse osmosis system for receiving a wash solution from the carbon dioxide wash station that has a first concentration of ammonia; and separating it to a permeate stream and a retentate stream; where the retentate stream has a higher concentration of ammonia than the first ammonia concentration and the permeate stream has a lower concentration of ammonia than the first ammonia concentration in the wash solution received from the carbon dioxide wash station; and where the carbon dioxide from the regenerator has a pressure of 3 to 25 bar.

Disclosed herein too is a method comprising charging a regenerator with a carbon dioxide rich solution received from an absorber; operating the regenerator at a pressure of 3 to 25 bar to extract carbon dioxide from the carbon dioxide rich solution; charging a carbon dioxide gas stream from the regenerator to a carbon dioxide wash station to reduce an ammonia concentration contained therein; charging a wash solution from the carbon dioxide wash station containing a first concentration of ammonia to a reverse osmosis system; splitting the wash solution containing the first ammonia concentration into a retentate stream and a permeate stream; where the retentate stream has a higher concentration of ammonia than the first ammonia concentration and the permeate stream has a lower concentration of ammonia than the first ammonia concentration in the wash solution received from the carbon dioxide wash station; discharging the retentate stream to the absorber; and discharging the permeate stream to the carbon dioxide wash station.

DETAILED DESCRIPTION

The invention now will be described more fully hereinafter with reference to the accompanying drawings, in which various embodiments are shown.

Disclosed herein is a system and a method for obtaining low pressure carbon dioxide from a chilled ammonia process. The carbon dioxide produced by this process is at a pressure of 3 to 25 bar, which is lower than the pressure of carbon dioxide generated in conventional chilled ammonia processes. The method comprises operating the regenerator in a chilled ammonia process at a lower pressure than in a conventional process in order to reduce the energy losses associated with high pressure steam utilization in the regenerator during high pressure carbon dioxide regeneration. In an embodiment, there is an electrical duty saving of up to at least 25% from the exergy losses when compared with a conventional chilled ammonia process. The method is particularly advantageous in that there is an electrical duty saving of at least 15%, preferably at least 18% and more preferably at least 20% from the exergy losses when compared with a conventional chilled ammonia process. Exergy is the energy that is available to be used.

One of the issues with low pressure carbon dioxide regeneration is the increase in the amount of ammonia emission from the carbon dioxide regenerator. Disclosed herein is a method where the excess ammonia at low pressure regeneration is captured in the carbon dioxide wash station and the resulting solution is processed in a reverse osmosis system where the retentate at higher ammonia concentration is sent to the absorber instead of sending it to the stripper. This reduces the energy consumed at the stripper. The permeate solution from the reverse osmosis system (also sometimes referred to as a membrane system) is sent back to the carbon dioxide wash section to capture ammonia from the incoming carbon dioxide product from the regenerator. Alternatively, a part of this stream may be sent to the waterwash to capture ammonia from the outgoing flue gas stream from the absorber.

Disclosed herein too is an arrangement that includes an absorber, a regenerator and a reverse osmosis system arranged in such a fashion to reduce the circulation flow between an absorber and a regenerator. This arrangement reduces the capital and operating cost of the plant. In this arrangement, a portion of water and some portion of the ionic absorbent from the carbon dioxide rich solution is separated using membrane separation technology before it goes to the regenerator and in turn reduce the capital and operating cost of the plant significantly as shown in the FIG. 3 (which will be detailed later).

Figure 1:
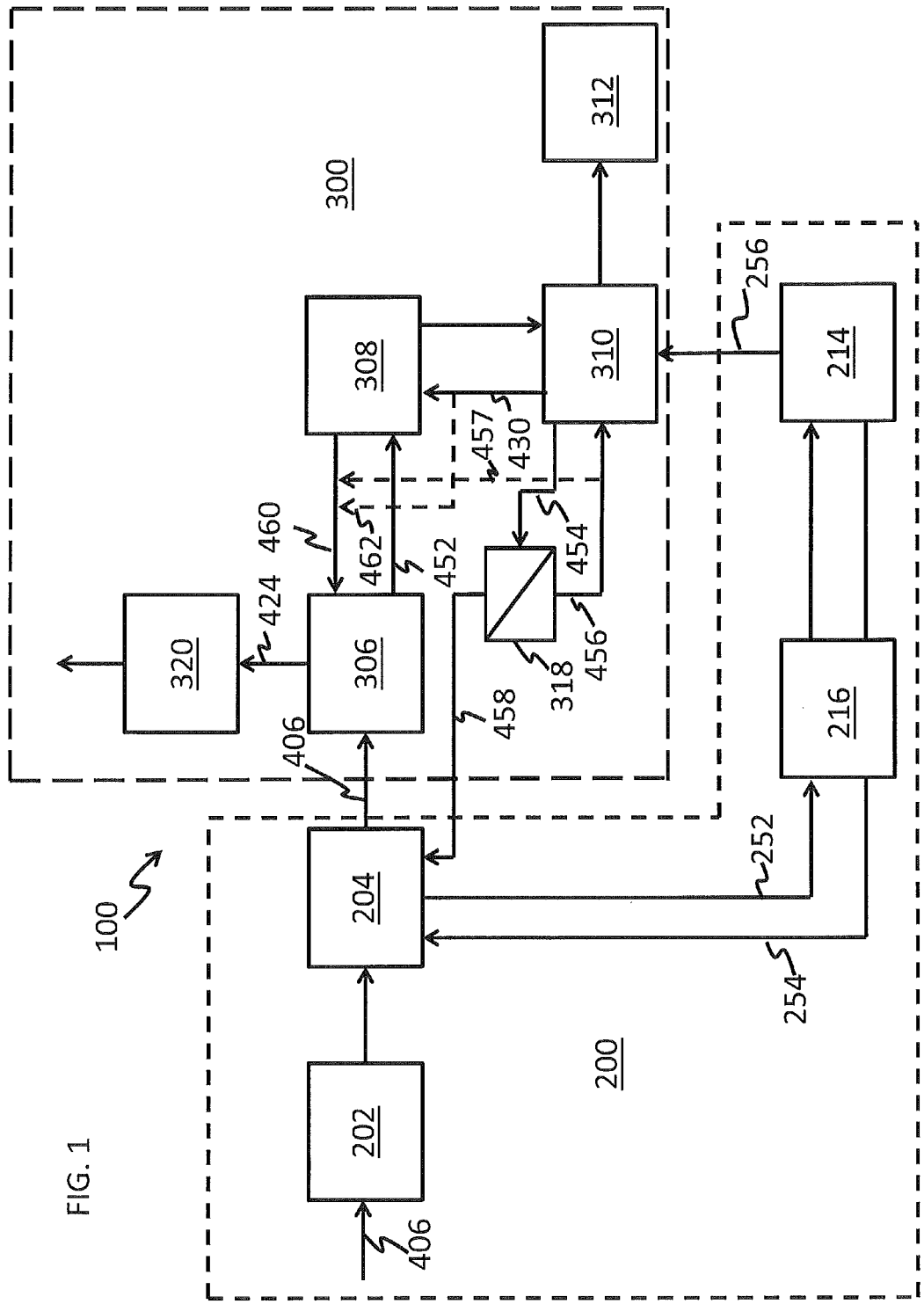
FIG. 1 is an exemplary schematic depiction of the system for obtaining carbon dioxide at lower pressures from a chilled ammonia process.
Figure 2:
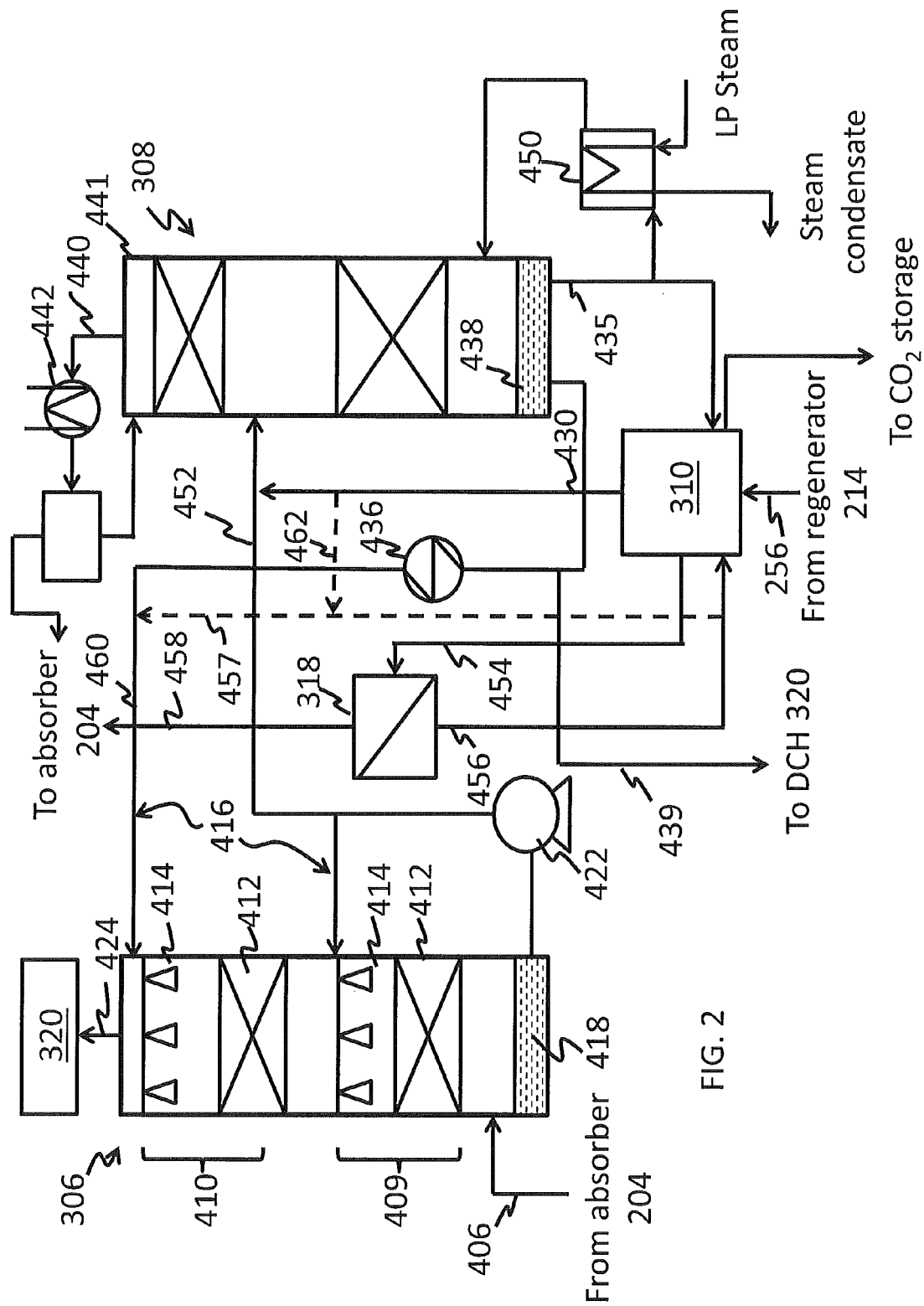
FIG. 2 is an expanded exemplary schematic of the wash system that is used to reduce ammonia slip while at the same time producing low pressure carbon dioxide.

FIGS. 1 and 2 are exemplary schematic depictions of the system 100 for obtaining carbon dioxide at lower pressures from a chilled ammonia process. The system comprises an ammonia absorber system 200 for removing a majority of the carbon dioxide present in the flue gas stream that emanates from a combustion process and a wash system 300 that facilitates the recovering of ammonia slip that occurs in the chilled ammonia process.

The absorber system 200 comprises a direct contact cooler 202 in fluid communication with an absorber 204. The absorber 204 receives a flue gas stream from a combustion process (or from a post-combustion process) that is substantially devoid of sulfur dioxide ($SO_2$), nitrogen oxides (NOx), and particulate matter from the direct contact cooler 202. The flue gas received at the absorber 204 contains a high percentage of carbon dioxide, which is to be extracted and reused for other purposes.

The absorber 204 employs an absorbent solution (disposed therein) or slurry that facilitates the absorption and the removal of a gaseous component such as carbon dioxide from the flue gas stream. In a chilled ammonia based carbon dioxide capture system, the absorbent solution in the main carbon dioxide absorber system 200 is a solution or slurry including ammonia. The ammonia can be in the form of an ammonium ion ($NH_4^+$) ammonium carbamate, ammonium bicarbonate, or in the form of dissolved molecular ammonia ($NH_3$). By way of example, the absorbent solution or slurry may be comprised of ammonium carbonate, carbamate and bicarbonate ions. The absorption of the acidic components such as carbon dioxide present in the flue gas stream is achieved when the absorber is operated at atmospheric pressure and at a low temperature, for example, between zero and thirty degrees Celsius (0-30° C.). In another example, absorption of the acidic component from flue gas stream is achieved when the absorber is operated at atmospheric pressure and at a temperature between zero and ten degrees Celsius (0-10° C.). By operating at relatively low temperatures, ammonia loss within the system is minimized.

By way of example in the absorber 204, the ammonia reacts with the carbon dioxide present in the flue gas to form ammonium carbonate, ammonium bicarbonate, ammonium carbamate, and the like and form a carbon dioxide lean flue gas stream. The process may generally be referred to as the main scrubbing process. After scrubbing, contaminants such as trace amounts of ammonia (also referred to as the ammonia slip) compounds and other degradation products remain in the carbon dioxide lean flue gas. In the present disclosure, the carbon dioxide lean flue gas with the contaminants is fed to a wash system 300, wherein the ammonia and other contaminants are removed from the carbon dioxide lean flue gas, which may then be discharged into the atmosphere or further processed within a direct contact heater (DCH) where residual ammonia is captured using acid such as sulfuric acid to form ammonium sulfate before discharging to the atmosphere via stack.

Disposed between the absorber 204 and the regenerator 214 is a rich-lean heat exchanger 216 that transfers heat from the carbon dioxide lean ammonia solution leaving the regenerator 214 for the absorber 204 and the carbon dioxide rich ammonia solution leaving the absorber for the regenerator 214. The absorber 204, the rich-lean heat exchanger 216 and the regenerator 214 all lie upstream as well as downstream of each other. In other words, they are in a recycle loop. The chilled ammonia process to remove the carbon dioxide from the post combustion flue gas stream is detailed in U.S. Pat. No. 8,308,849 B2 to Gal; U.S. Pat. No. 8,758,493 B2 to Gal; and US 2012/0258031 A1 to Guidolin et al., the entire contents of which are hereby incorporated by reference.

In an embodiment, the regenerator 214 operates at a lower pressure of about 3 to 25 bar, preferably 4 to 20 bar, and more preferably 5 to 15 bar, which is lower than other conventionally operated regenerators. In an exemplary embodiment, the regenerator 214 operates from 3 to 15 bar. In the regenerator 214, the carbon dioxide rich stream 252 is contacted by steam and generates a gaseous component (comprising mostly gaseous carbon dioxide) and an ammonia solution. The gaseous component containing carbon dioxide, traces of ammonia and water ends in the carbon dioxide wash station 310 while the liquid component, which contains a substantial amount of ammonia, returns to the absorber 204 after passing through rich-lean heat exchanger 216. The carbon dioxide is sequestered while an ammonia solution (obtained from the traces of ammonia) containing a first concentration of ammonia is discharged to the reverse osmosis system 318.

The gaseous carbon dioxide, ammonia and water leave the top of the regenerator 214 and enter the carbon dioxide wash station 310. The liquid ammonia-carbon dioxide-water solution known as "lean" solution leaves from the bottom of the regenerator 214 and enters the absorber 204 after passing through rich-lean heat exchanger 216. In the carbon dioxide wash station 310, most of the ammonia is captured and the water is condensed using cold re-circulating water. In this resulting solution, the maximum ammonia molarity allowed is approximately 1.5 M (molar). Finally, a clean carbon dioxide gas stream leaves from the carbon dioxide wash vessel (with less than 10 ppm ammonia) and is discharged to either a compressor or to a storage section or delivered to the client at that particular specification.

The ammonia solution having a first concentration of ammonia is discharged from the carbon dioxide wash station 310 to the reverse osmosis system 318 via first stream 454 (having a first ammonia concentration) where it is processed into two streams—a second stream 456 (having a second ammonia concentration) and a third stream 458 (having a third ammonia concentration). Stream 458 contains a higher concentration of the ammonia (than the first concentration) and is discharged to the absorber 204 to interact with the flue gas stream as detailed above. Stream 456 has a lower ammonia concentration than stream 454 (i.e., than the first concentration) and is recharged to the carbon dioxide wash station 310 where the ammonia is captured. The stream 458 having the higher ammonia concentration is called the retentate stream while the stream having the lower ammonia concentration is called the permeate stream. Alternatively, a portion of this stream 456 may be recharged to the wash vessel 306 via streams 457 and 460.

The wash system 300 comprises a wash vessel 306, an ammonia stripper column 308, a reverse osmosis system 318, a carbon dioxide wash station 310, a direct contact heater (DCH) 320 and a carbon dioxide compression and storage system 312. As can be seen in the FIG. 1, the wash vessel 306 and the stripper column 308 lie in a recycle loop. Similarly, the carbon dioxide wash station 310 and the ammonia stripper system 308 lie in a recycle loop. The reverse osmosis system 318 is in a recycle loop with the carbon dioxide wash station 310. The reverse osmosis system 318 lies upstream of the absorber 204 of the absorption system 200. Purified carbon dioxide obtained from the carbon dioxide wash station 310 is discharged to a sequestration station 312 to be stored at a low pressure.

It is to be noted that while the FIGS. 1 and 2 show only a single reverse osmosis system 318, there can be a plurality of reverse osmosis devices connected in series or in parallel with one another to facilitate removal of the ammonia traces in the carbon dioxide gas stream received from the wash station.

The wash system 300 is used to reduce ammonia slip while at the same time producing carbon dioxide at low pressures for other consumer applications. It is to be noted that there are two ammonia wash vessels. One is the wash vessel 306, which removes ammonia from the flue gas stream (entering from 204) and the other is the carbon dioxide wash station 310, which is much smaller in size and receives a stream (at pressures of 3 to 25 bar for removing ammonia from the carbon dioxide product) from regenerator 214.

The FIG. 2 is an expanded exemplary schematic of the wash system 300 that is used to reduce ammonia slip while at the same time producing low pressure carbon dioxide. The wash vessel 306 generally includes one or more absorption stages. In the exemplary embodiment shown, the wash vessel includes a first absorption stage 409 and a second absorption stage 410. The wash vessel 306 is not limited in this regard as it is contemplated that the wash vessel may have more or less absorption stages. Each of the absorption stages may include a mass transfer device 412, a spray head system 414, and a liquid delivery path 416. The $CO_2$ lean flue gas 406 from the absorber (not shown) enters the first absorption stage 409 at a bottom portion of the wash vessel 306. While the opening is shown at the bottom portion, it is contemplated that the $CO_2$ lean flue gas 406 may be at any point in the wash vessel and may vary from system to system depending on the application.

The mass transfer device 412 may include packing, such as, for example, random packing, hydrophilic packing, and/or structural packing. Random packing is generally known in the art and refers to packing material introduced to the absorption stage in an un-organized fashion. Examples of random packing include, but are not limited to plastic, metal and/or ceramic packing material offered in different sizes, e.g., material having varying diameters, for example, diameters ranging between about 2.5 centimeters (2.5 cm) to about 7.6 centimeters (7.6 cm) (about 1 inch to about 3 inches). Random packing material is available from many suppliers, including, but not limited to Jaeger Products Inc. (Houston, Tex., United States). Random packing material may also include wood. Hydrophilic packing includes, but is not limited to polypropylene bags.

Structural packing is generally known in the art and refers to packing material that is arranged or organized in a specific fashion. Typically, structural packing is arranged in a manner to force fluids to take a complicated path, thereby creating a large surface area for contact between the liquid and gas. Structural packing includes, but is not limited to structures made of metal, plastic, wood, and the like. It is contemplated that different packing materials facilitate ammonia removal or reduction at different flow rates of a liquid into the wash vessel 306. Additionally, it is contemplated that the different packing materials may provide more suitable pressure drops.

In one embodiment, one of the absorption stages 409 or 410 of the wash vessel 306 includes random packing material as the mass transfer device 412 and another of the absorption stages 409 or 410 of the wash vessel 306 includes structural packing as the mass transfer device. For example, first absorption stage 409 may include random packing material as the mass transfer device 412 and second absorption stage 410 may include structural packing as the mass transfer device. It is contemplated that the carbon dioxide lean flue gas 406 enters the wash vessel 306 and passes through the first absorption stage 409 prior to passing through the second absorption stage 410.

In each of the absorption stages 409, 410, the mass transfer device 412 is located beneath the spray head system 414. Each of the spray head systems 414 in wash vessel 306 sprays a liquid onto the absorption stages 409, 410. The liquid is transported to the spray head system 414 via one of the liquid delivery paths 416. The liquid delivery paths 416 are conduits that transport the liquid to the respective spray head system 414. The liquid may be any liquid suitable to facilitate the removal of ammonia from the carbon dioxide lean flue gas 406. An example of a suitable liquid is water, which is known to absorb, i.e., dissolve, ammonia through interactions between the ammonia and the water.

In one particular embodiment, the liquid introduced to the second absorption stage 410 is liquid, e.g., water, provided by a stripping column 308. That is, water that has had all or substantially all of the ammonia as well as other contaminants contained therein removed and/or substantially removed. The liquid provided to the first absorption stage 409 is liquid 418 (also referred to as the washed liquid), which is water-containing a low concentration of ammonia recycled from the bottom of the wash vessel 306, which may be passed via pump 422 through an optional heat exchanger (not shown).

The liquid is introduced at the top of each absorption stage 409, 410, e.g., liquid 418 is provided to the top of first absorption stage 409 and liquid from the stripper 308 is provided to the top of second absorption stage 410 of the wash vessel 306 (as the ammonia polishing stage). The liquid travels in a direction down a length of the wash vessel 306, which is countercurrent to a direction that the carbon dioxide lean flue gas 406 travels. As will be appreciated, the liquid travels in direction by virtue of gravity, while the carbon dioxide lean flue gas 406 travels in a countercurrent direction by virtue of several factors, including pressure drops within the wash vessel 306.

As the liquid travels down the length of the wash vessel 306, the ammonia concentration in the liquid increases, thereby forming the ammonia-rich liquid 418. Conversely, as the carbon dioxide lean flue gas 406 travels in a direction up a length of the wash vessel 306, the ammonia concentration (as well as the concentration of the other water soluble contaminants) decreases, thereby forming a reduced ammonia-containing flue gas stream 424, which may be further treated such as being fed to a direct contact heater (DCH) 320 (See FIG. 1) and/or discharged into the atmosphere.

It should be appreciated that the amount of ammonia removed from the carbon dioxide lean flue gas 406 varies from system to system and application to application. It is also contemplated that the system be designed in a manner that the ammonia concentration in the reduced ammonia containing flue gas stream 424 is low and close to an equilibrium concentration of ammonia in the gas relative to the vapor pressure of the ammonia in the liquid. The equilibrium concentration of ammonia in the flue gas stream 424 may be as low as below ten parts per million (10 ppm) and typically in the range of between about zero parts per million (0 ppm) to about two hundred parts per million (200 ppm).

In one embodiment, the reduced ammonia containing flue gas stream 424 contains at least about seventy percent (70%) less ammonia as compared to a level of ammonia in the carbon dioxide lean flue gas 406. In another embodiment, the reduced ammonia containing flue gas stream 424 contains at least about seventy five percent (75%) less ammonia as compared to a level of ammonia in the carbon dioxide lean flue gas 406. In yet a further embodiment, the reduced ammonia containing flue gas stream 424 contains at least about eighty percent (80%) less ammonia as compared to a level of ammonia in the carbon dioxide lean flue gas 406. In another embodiment, the reduced ammonia containing flue gas stream 424 contains at least about eighty five (85%) less ammonia as compared to a level of ammonia in the ammonia-containing flue gas stream 406. It is contemplated that the level of ammonia in the reduced ammonia containing flue gas stream 424 may be about ninety percent (90%), ninety five percent (95%), ninety nine percent (99%) or ninety nine and a half percent (99.5%) less than the level of ammonia in the carbon dioxide lean flue gas 406.

An effective flow rate of liquid suitable to reduce the amount of ammonia in the flue gas varies from system to system. In one embodiment, the flow rate is suitable to reduce an amount of ammonia in the flue gas to an amount close to the equilibrium concentration and typically to below two hundred parts per million (200 ppm) in the flue gas stream. In another embodiment, the flow rate is suitable to reduce an amount of ammonia in the flue gas from about two thousand parts per million (2000 ppm) to between about seventy parts per million and about one hundred parts per million (70-100 ppm). In another embodiment, the flow rate of the liquid is between about 1.8 liters per minute (1.8 lpm, or about 0.5 gallons per minute) to about 7.5 liters per minute (7.5 lpm or about 2 gallons per minute) per one thousand cubic feet per minute (1000 cfm) of flue gas. The liquid flow rate can be adjusted to the desired ammonia slip level from the wash vessel.

Still referring to FIG. 2, the liquid falls to the bottom of the wash vessel 306 and is removed therefrom as ammonia-rich liquid 418. A portion of the ammonia-rich liquid 418 may be recycled to the wash vessel 306 as liquid and a portion of the ammonia-rich liquid is charged to the stripping column 308 via stream 452. Additionally, while not shown, it is contemplated that the entire amount of the ammonia-rich liquid 418 may be sent to the stripping column 308 and then returned to the wash vessel 306.

The ammonia rich liquid 418 may be fed to an optional heat exchanger (not shown) before being discharged to the stripping column 308. In one embodiment, in a typical chilled ammonia process, a carbon dioxide loaded solution (slip stream) is sent from the carbon dioxide wash station 310 to the absorber 204 (See stream 462 in the FIG. 1) to reduce the ammonia slip. In the present disclosure, a clean water solution 438 from the stripper 308 is sent to the carbon dioxide wash water via stream 435 as shown in FIG. 2 to maintain the mass balance and the ammonia molarity in the carbon dioxide wash water.

The stripping column 308 utilizes steam from reboiler 450 to remove the ammonia and the other contaminants from the increased molarity ammonia-rich fluid stream 430 as well as stream 452 (which is transported from the wash vessel 306) to form the ammonia lean liquid 438 that can then be recycled to the wash vessel 306 or fed to the direct contact cooler or direct contact heater as may be desired in some applications. Recycling to the wash vessel 306 generally includes reducing the temperature ammonia lean liquid 438 by feeding through heat exchanger 436 and then through chiller (not shown) prior to introduction into the wash vessel 306.

It is contemplated that the stripping column 308 may utilize other technology or techniques in order to remove the ammonia and other contaminants from the increased molarity ammonia-rich fluid stream 430 as well as stream 452. The increased molarity ammonia-rich fluid stream 430 may be mixed with lean solution 452 used in the absorber (ammonia solution or slurry) prior to introduction into the stripper to further increase the ammonia concentration of the liquid being fed to the stripper column 308 so as to further reduce the energy requirements of the stripper system. Optionally, the stripping column 308 may be operated at vacuum conditions to reduce the temperature of the steam utilized in the stripping column. In a typical chilled ammonia process, the slip stream (lean solution) from the absorber-regenerator loop is processed via an appendix stripper (not shown) to maintain the water balance within the process. The appendix stripper bottom is sent to the direct contact cooling or direct contact heating (DCC/DCH) section and the top portion which contains ammonia and $CO_2$ is sent to the absorber. In the proposed process described herein, it is expected that the additional appendix stripper for water balance is advantageously not needed and the slip stream from the absorber-regenerator loop can be combined directly with the nano-filtration or reverse osmosis retentate (assuming it will have the same ammonia molarity as the lean solution from the absorber-regenerator loop) before processing through stripper. The extra water from the stripper can be sent from the bottom portion of stripper 308 to the DCC/DCH section via conduit 439 as shown in FIGS. 1 and 2.

With regard to the stream 256 from the regenerator 214, the operation of the regenerator 214 at lower pressures of 3 to 25 bar, produces carbon dioxide at the lower pressure of 3 to 25 bar. While this carbon dioxide is desirable to consumers, the production of this low pressure carbon dioxide is accompanied by the presence of increased amounts of ammonia when compared with conventional high pressure operation of the regenerator 214. It is therefore desirable to remove this excess generated ammonia.

In an embodiment, this is accomplished by discharging a carbon dioxide gas stream 256 that contains traces of ammonia to the water wash system 310. As noted above, in the carbon dioxide wash station 310, most of the ammonia is captured and the water is condensed using cold re-circulating water. In this resulting solution, the maximum ammonia molarity allowed is approximately 1.5 M (molar). A wash solution from the carbon dioxide wash station that contains traces of ammonia is discharged to the reverse osmosis system 318.

In the reverse osmosis system 318, the wash solution from the water wash system 454 that contains ammonia is physically separated into two feed streams 456 and 458. In feed stream 458, the ammonia concentration is increased relative to the ammonia concentration of the wash solution stream 454 to form an increased molarity ammonia rich liquid stream (i.e., retentate), whereas in feed stream 456, the ammonia concentration is decreased relative to the ammonia concentration of the wash solution stream 454 to form a decreased molarity ammonia rich liquid stream (i.e., permeate).

In an embodiment, the wash solution stream 454 has an ammonia concentration of up to 1.5 M, while the retentate (feed stream 458) has an ammonia concentration of greater than 1.5 M to 8 M.

In this embodiment, the retentate stream 458 having the higher ammonia concentration is charged to the absorber 204. This reduces the amount of energy used by the stripper 308. The permeate stream 456 having the lower ammonia concentration is charged back to the carbon dioxide wash station 310 where it may be combined with stream 430 and treated in the stripping column 308. Alternatively, a portion of the permeate stream 456 may be recharged to the wash vessel 306 via streams 457 and 460. As noted above, the wash station 306 captures ammonia slip from the outgoing flue gases from the absorber 204 (See FIG. 1)

The fluid stream 440 including the recovered ammonia fluid and other volatile contaminants is discharged from a top portion 441 of the stripper column 308, cooled via chiller 442 and recycled to the absorber and/or recycled back to the stripper column 308. For example, the recovered ammonia fluid stream 440 may be recycled for use in the absorber as an ammoniated solution. However, it is contemplated that the ammonia may be utilized at other points inside and outside of system 100.

Pure carbon dioxide obtained from the regenerator 214 at the lower pressures specified above may be discharged to storage 312 (See FIG. 1) for sequestration or alternatively, for repackaging and sale to consumers. As detailed above method is advantageous in that there is an electrical duty saving of at least 20% from the exergy losses that would occur if a conventional chilled ammonia process were used followed by using external means to reduce carbon dioxide pressure. Hence, a significant amount of saving on the overall electrical energy associated with power plant steam extraction can be achieved in cases where the carbon dioxide product is to be used at lower pressure.

As noted above, another arrangement disclosed herein pertains to a combination of an absorber, a regenerator and a reverse osmosis system in which the reverse osmosis system is fed with a portion of the carbon dioxide rich stream from the absorber. The permeate from the reverse osmosis system is returned to the absorber, while the retentate is charged to the regenerator. This reduces the capital and operating cost of the plant significantly.

In conventional chilled ammonia processes, carbon dioxide is captured in the absorber and the rich solution is sent to the regenerator to release the captured carbon dioxide by heating the rich solution with the saturated steam. The rich solution normally has carbon dioxide loading between 0.3-0.6 (moles of carbon dioxide/moles of absorbent) depending on operating conditions and absorbent utilization. This generally means that a large amount of circulation flow between absorber and the regenerator is used, which increases the capital and the operating cost of the plant. The purpose of using the reverse osmosis in conjunction with the absorber is to separate the water and some portion of the ionic absorbent from the carbon dioxide rich solution before it goes to the regenerator by using membrane separation technology and in turn reduce the capital and operating cost of the plant significantly as shown.

Figure 3:
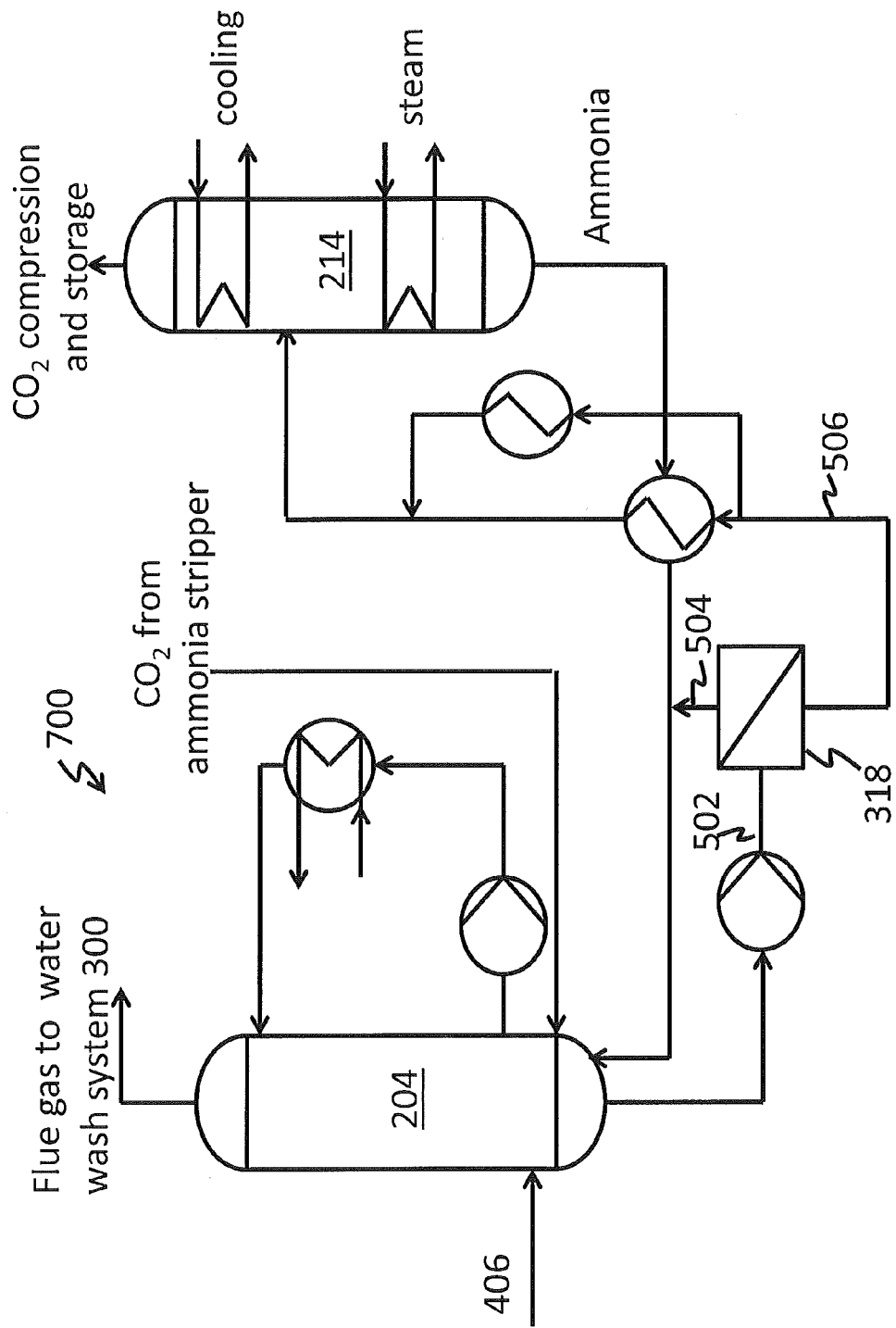
FIG. 3 is an exemplary schematic depiction of a device that reduces circulation flow between the absorber and regenerator.

FIG. 3 shows a depiction of this system 700. As can be seen in the FIG. 3, the reverse osmosis system 318 lies downstream of the absorber 204 and upstream of the regenerator 214.

In the FIG. 3 (which should be viewed in conjunction with FIGS. 1 and 2), a portion of the carbon dioxide rich stream from the absorber 204 is charged to the reverse osmosis system 318 via stream 502. The carbon dioxide rich stream is pressurized to overcome the osmotic pressure of the solution. The purpose is to separate the water and some portion of the ionic absorbent from the carbon dioxide rich solution before it goes to the regenerator 214 by using membrane separation technology and in turn reduce the capital and operating cost of the plant significantly.

The permeate (with molecular ammonia, small amount of ionic ammonia and water) is recharged to the absorber via stream 504 and is used to absorb carbon dioxide from the incoming flue gas stream 406. The retentate (the stream that contains higher amount of ammonia than the stream 502 such as ammonium bicarbonate, ammonium carbonate, ammonium carbamate, and the like) is charged to the regenerator 214 via stream 506. In the regenerator 214, the retentate is dissociated into carbon dioxide gas which is compressed and transported to customers. The ammonia solution from the regenerator is returned to the absorber to absorb more carbon dioxide from the flue gas stream 406.

The transition term comprising encompasses the transition terms "consisting of" and "consisting essentially of".

The term "and/or" includes both "and" as well as "or". For example, "A and/or B" is interpreted to be A, B, or A and B. As used herein, the term "and/or" includes any and all combinations of one or more of the associated listed items.

This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A system for generating a carbon dioxide gas stream comprising:
    an absorber that is operative to use an ammoniated solution to extract carbon dioxide from a flue gas stream to produce a carbon dioxide rich solution;
    a regenerator that lies downstream of the absorber; where the regenerator operates at a pressure of 3 to 25 bar and is operative to extract carbon dioxide from the carbon dioxide rich solution;
    a carbon dioxide wash station that lies downstream of the regenerator; where the carbon dioxide wash station is operative to receive a carbon dioxide gas stream and to reduce an ammonia concentration contained therein;
    a reverse osmosis system for receiving a wash solution from the carbon dioxide wash station that has a first concentration of ammonia; and separating it into a permeate stream and a retentate stream; where the retentate stream has a higher concentration of ammonia than the first ammonia concentration and the permeate stream has a lower concentration of ammonia than the first ammonia concentration in the wash solution received from the carbon dioxide wash station; and where the carbon dioxide from the regenerator has a pressure of 3 to 25 bar.

2. The system of claim 1, where the retentate stream is discharged to the absorber.

3. The system of claim 1, where the permeate stream is discharged to the carbon dioxide wash station.

4. The system of claim 1, where the absorber and the regenerator are in a recycle loop with each other and where the carbon dioxide wash station and the reverse osmosis system are in a recycle loop with each other.

5. The system of claim 1, where the absorber and the regenerator are part of an absorber system that further comprises a rich lean heat exchanger; where the rich lean heat exchanger is operative to exchange heat between the carbon dioxide rich solution and a carbon dioxide lean solution that is generated in the regenerator.

6. The system of claim 1, where the carbon dioxide wash station and the reverse osmosis system are part of a wash system that further comprises a wash vessel and a stripping column; where the wash vessel is operative to receive a stream of flue gas from the absorber and where the stripping column and the carbon dioxide wash station are in a recycle loop with each other.

7. The system of claim 1, where the carbon dioxide from the regenerator has a pressure of 3 to 15 bar.

8. The system of claim 1, where the absorber receives the flue gas stream from a combustion process.

9. The system of claim 1, where the reverse osmosis system comprises a plurality of osmosis devices; each one of which is operative to create a retentate stream and a permeate stream.

10. The system of claim 1, where the first concentration of ammonia is up to 1.5 molar and where the retentate stream has an ammonia concentration of greater than 1.5 to 8 molar.

* * * * *

UNITED STATES PATENT AND TRADEMARK OFFICE
CERTIFICATE OF CORRECTION

PATENT NO. : 9,573,816 B2      Page 1 of 1
APPLICATION NO. : 14/677238
DATED : February 21, 2017
INVENTOR(S) : Dube It is certified that error appears in the above-identified patent and that said Letters Patent is hereby corrected as shown below:

On the Title Page

In item (56), under "U.S. PATENT DOCUMENTS", in Column 2, Line 2, delete "Gal et al." and insert -- Gal --, therefor.

In the Specification

In Column 3, Line 27, delete "($NH_4^+$)" and insert -- ($NH_4^+$), --, therefor.

In Column 4, Line 1, delete "8,758,493 B2 to Gal;" and insert -- 8,758,493 B2 to Gal et al.; --, therefor.

In Column 5, Line 39, delete "limited to" and insert -- limited to, --, therefor.

In Column 5, Line 45, delete "limited to" and insert -- limited to, --, therefor.

In Column 5, Line 48, delete "limited to" and insert -- limited to, --, therefor.

In Column 5, Line 54, delete "limited to" and insert -- limited to, --, therefor.

In Column 7, Line 10, delete "eighty five (85%)" and insert -- eighty five percent (85%) --, therefor.

In Column 7, Lines 11-12, delete "ammonia-containing flue gas stream 406." and insert -- carbon dioxide lean flue gas 406. --, therefor.

In Column 9, Line 7, delete "FIG.1)" and insert -- FIG.1). --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*